United States Patent
Zhang et al.

(10) Patent No.: US 7,279,513 B2
(45) Date of Patent: Oct. 9, 2007

(54) PREPARATION OF NEUTRALIZED ETHYLENE-ACRYLIC ACID POLYMER DISPERSIONS AND USE IN PRINTING MEDIA FOR IMPROVEMENT OF DIGITAL TONER ADHESION

(75) Inventors: Zhiyi Zhang, Naperville, IL (US); Ross T. Gray, Plainfield, IL (US); Wesley L. Whipple, Naperville, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 11/246,795

(22) Filed: Oct. 7, 2005

(65) Prior Publication Data

US 2006/0111488 A1     May 25, 2006

Related U.S. Application Data

(63) Continuation-in-part of application No. 10/993,235, filed on Nov. 19, 2004, now abandoned.

(51) Int. Cl.
*B32B 7/12* (2006.01)
*C09D 5/02* (2006.01)

(52) U.S. Cl. .................. 524/47; 524/186; 524/247; 524/501

(58) Field of Classification Search ............... 524/47, 524/247, 186, 501
See application file for complete search history.

(56) References Cited

U.S. PATENT DOCUMENTS

| | | | |
|---|---|---|---|
| 3,389,109 A | 6/1968 | Harmon et al. | |
| 3,872,039 A | 3/1975 | Vaughn et al. | |
| 3,899,389 A | 8/1975 | Vaughn et al. | |
| 4,181,566 A | 1/1980 | Vaughn et al. | |
| 5,206,279 A | 4/1993 | Rowland et al. | |
| 5,330,788 A * | 7/1994 | Roberts | 427/154 |
| 5,387,635 A | 2/1995 | Rowland et al. | |
| 5,998,038 A | 12/1999 | Shibatani et al. | |
| 6,200,721 B1 | 3/2001 | Shibatani et al. | |
| 6,482,886 B1 | 11/2002 | Finlayson et al. | |
| 2004/0244928 A1 | 12/2004 | Huang et al. | |
| 2006/0124554 A1 * | 6/2006 | Fechtenkotter et al. | 210/732 |

FOREIGN PATENT DOCUMENTS

| EP | 0 789 281 B1 | 8/1997 |
|---|---|---|
| EP | 1 273 975 A1 | 1/2003 |

* cited by examiner

*Primary Examiner*—Kriellion A Sanders
(74) *Attorney, Agent, or Firm*—Michael B. Martin; Thomas M. Breininger

(57) ABSTRACT

Aqueous dispersions comprising one or more ethylene-acrylic acid polymers and an effective dispersing amount of one or more N,N-dialkylalkanolamines are useful for preparing substrates for use in electrophotographic or digital offset printing processes.

22 Claims, No Drawings

PREPARATION OF NEUTRALIZED ETHYLENE-ACRYLIC ACID POLYMER DISPERSIONS AND USE IN PRINTING MEDIA FOR IMPROVEMENT OF DIGITAL TONER ADHESION

CROSS REFERENCE TO RELATED APPLICATIONS

This is a continuation-in-part of Ser. No. 10/993,235, filed Nov. 19, 2004, now abandoned.

TECHNICAL FIELD

This invention relates to neutralized ethylene-acrylic acid polymer dispersions and use of the dispersions to prepare substrates for receiving images in electrophotographic and digital offset printing applications.

BACKGROUND OF THE INVENTION

Indigo liquid toner offset printing is a hybrid of electrophotographic printing and offset printing. Electrophotographic printing generally involves charging a photosensitive receptor drum, laser scanning an image or text area of the photosensitive receptor surface, depositing charged toner particles onto the image area of the photosensitive receptor drum to develop a latent image, transferring the toner image from the photosensitive receptor drum to a charged substrate like paper, and finally fusing the toner particles on the paper surface with heat and pressure. Offset printing simply means that there is an intermediate blanket cylinder that transfers the ink or toner image from its origin on the plate cylinder to the final substrate (i.e. paper).

In most electrophotographic printers, dry powder toner particles that consist of color pigment, charge director, and polymer binder are used. There is a lower limit of 7 to 9 microns on the particle size of these toners because as they become smaller, they can become airborne in the press. This results in printing problems and may cause health problems for the press operators. The large toner particles hurt print quality because of their inability to reproduce fine detail and acceptable colors. Therefore, high quality images cannot be printed with dry toner electrophotographic printers.

Liquid toner formulations contain toner particles as small as 1 to 2 microns because the solvent in the formula keeps them from becoming airborne. Images produced from these toners have higher quality due to their ability to be transferred precisely onto the photosensitive receptor surface. The solvent in liquid toner formulations must be removed either by evaporation prior to the transfer of toner to the paper surface or by drying after the toner has been transferred to the paper. In digital offset printing (e.g. HP Indigo printer), a thermal offset blanket cylinder is placed between the photosensitive image drum and the paper surface that is supported on the back side by an impression drum. The liquid toner is heated by the offset blanket cylinder to first cause the pigment-carrying particles in the liquid toner to melt and solvate into a uniform blend, and then to evaporate the solvent when the offset blanket cylinder transfers the liquid toner onto the paper surface. When the liquid toner contacts the cool paper surface, it becomes viscous enough to adhere to the paper and solidify immediately to allow fast printing. The thermal offset in an Indigo printer provides two advantages over dry powder electrophotographic printing: the paper does not need to be conductive in order to receive the toner and no fusion step is needed to melt the dry toner particles to the paper surface.

Toner adhesion failure has been a problem for both electrophotographic and digital offset printing. The toner adhesion failure is particularly severe for digital offset printing due to the lack of a fusion step to fix the liquid toner particles onto the paper surface. Poor toner adhesion results in incomplete transfer of the toner to the paper surface, leaving a residue behind on the offset blanket cylinder, and low resistance of the printed image to becoming dislodged in subsequent converting operations. A process called sapphire treatment is being used to coat the paper surface with a layer of polyethyleneimine to improve liquid toner adhesion. But sapphire treatment has drawbacks that include a limited paper shelf life of six to eight months, yellowing, the need to apply the coating in an additional step after papermaking, and a tendency for the toner image to scuff easily during finishing and handling.

The use of ethylene-acrylic acid copolymer to prepare suitable substrates for digital offset printing has been disclosed, for example, in EP 1273975 and 0789281. The polymers are typically dispersed in water prior to application to the substrate. However, the polymers are not dispersible in their acid form and must be at least partially neutralized in order to prepare a stable aqueous dispersion with low viscosity and suitable particle size.

Dispersions of ethylene-acrylic acid polymers have been prepared using amines such as ammonia and monoethanolamine, alkali metal hydroxides, alkaline earth metal hydroxides and mixtures of amines and strong bases. See U.S. Pat. Nos. 3,389,109; 3,872,039; 3,899,389; 4,181,566; 5,206,279; and 5,387,635. The preparation of an aqueous dispersion of polyethylene-co-acrylic acid polymer (20 percent acrylic acid by weight) in an aqueous solution of sodium hydroxide and ethanolamine is described in example 19 of U.S. Pat. No. 5,387,635. However, the dispersion of the same polymer prepared in ethanolamine is not stable as evidenced by the observation that the viscosity of the dispersion increased dramatically overnight.

Accordingly, there is an ongoing need for improved paper surface treatments for digital offset printing applications using liquid toner formulations. These treatments should be stable, improve toner adhesion, have the ability to be applied during paper production, have good durability, and resist photoyellowing.

SUMMARY OF THE INVENTION

In an embodiment, this invention is an aqueous dispersion comprising one or more ethylene-acrylic acid polymers and an effective dispersing amount of one or more N,N-dialkylalkanolamines.

In an embodiment, this invention is a method of preparing an aqueous ethylene-acrylic acid polymer dispersion comprising mixing one or more ethylene-acrylic acid polymers with an effective dispersing amount of one or more N,N-dialkylalkanolamines in an aqueous medium.

In an embodiment, this invention is a method of preparing a substrate for use in electrophotographic or digital offset printing processes comprising applying to the substrate an aqueous dispersion comprising one or more ethylene-acrylic acid polymers and an effective dispersing amount of one or more N,N-dialkylalkanolamines.

In an embodiment, this invention is a substrate for use in electrophotographic printing processes comprising one or more ethylene-acrylic acid polymers and one or more N,N-dialkylalkanolamines.

Unlike ammonium neutralized ethylene-acrylic acid copolymers, in which ammonia is released to the air during processing resulting in separation of the polymer from the aqueous phase, no such separation occurs with dispersions neutralized with N,N-dialkylalkanolamines according to this invention due to the higher boiling point (136° C. for N,N-dimethylethanolamine) of the N,N-dialkylalkanolamines. Additionally, compared to ethylene-acrylic acid dispersions in alkaline metal hydroxides such as KOH, NaOH and LiOH, and the like, the hydroxyl group on the N,N-dialkylalkanolamines provides improved adhesion of the polymer to the substrate as the hydroxyl group is capable of forming hydrogen bonds as both a donor and acceptor. Furthermore, the hydroxyl functional group allows the invention product to further react with other functional groups such as anhydride, epoxy, isocyanate to form covalent bonds to provide better adhesion.

DETAILED DESCRIPTION OF THE INVENTION

The ethylene-acrylic acid polymers of this invention are prepared by free radical polymerization of ethylene and acrylic acid and optionally one or more additional ethylenically unsaturated monomers. See for example U.S. Pat. Nos. 6,482,886 and 5,387,635 and references cited therein. Representative additional monomers include methacrylic acid, maleic acid and anhydride, itaconic acid, fumaric acid, crotonic acid and citraconic acid and anhydride, methyl hydrogen maleate, ethyl hydrogen maleate, propylene, butene, isobutene, butadiene, isoprene, styrene, α-methylstyrene, t-butylstyrene, ethyl acrylate, methyl methacrylate, ethyl methacrylate, methyl acrylate, isobutyl acrylate, and methyl fumarate, vinyl acetate, vinyl propionate, vinyl benzoate, vinyl and vinylidene chloride, acrylamide, acrylonitrile, methacrylonitrile, fumaronitrile, and the like.

In an embodiment, the ethylene-acrylic acid polymer comprises about 5 to about 30 mole percent of acrylic acid monomers.

In an embodiment, the ethylene-acrylic acid polymer comprises about 5 to about 20 mole percent of acrylic acid monomers.

In an embodiment, the ethylene-acrylic acid polymer comprises about 14 to about 20 mole percent of acrylic acid monomers.

In an embodiment, the ethylene-acrylic acid polymer comprises about 5 to about 25 weight percent of acrylic acid monomers.

In an embodiment, the ethylene-acrylic acid polymer comprises about 14 to about 25 weight percent of acrylic acid monomers.

The molecular weights of the ethylene-acrylic acid polymers useful in the aqueous dispersion of this invention are indicated as melt index (MI). The melt index is measured according to ASTM D 1238 Condition E (190° C./2.16 kg), unless reported otherwise.

In an embodiment, the ethylene-acrylic acid polymers have a melt index of about 10 g/10 minutes to about 3,000 g/10 minutes.

In an embodiment, the ethylene-acrylic acid polymers have a melt index of about 10 g/10 minutes to about 2,500 g/10 minutes.

In an embodiment, the ethylene-acrylic acid polymers have a melt index of about 10 g/10 minutes to about 200 g/10 minutes.

Suitable ethylene-acrylic acid polymers are commercially available, for example from The Dow Chemical Company, Midland, Mich.

The aqueous dispersion of this invention is prepared by reacting the ethylene-acrylic polymer with an effective dispersing amount of one or more N,N-dialkylalkanolamines. "Effective dispersing amount" means the amount of N,N-dialkylalkanolamines required to at least partially neutralize the ethylene-acrylic acid polymer resulting in a stable aqueous dispersion having the desired viscosity and particle size.

The neutralization reaction is typically conducted at a temperature of up to about 130° C., often at a temperature of about 120° C. to 130° C. in the presence of an amount of N,N-dialkylalkanolamines suitable to result in an aqueous dispersion comprising dispersed solids having a mean particle size less than about 100 nm.

In an embodiment, the aqueous dispersion is prepared by reacting the ethylene-acrylic polymer with about 0.2 to about 1.4 molar equivalents of one or more N,N-dialkylalkanolamines in aqueous medium.

In an embodiment, the aqueous dispersion is prepared by reacting the ethylene-acrylic polymer with about 0.5 to about 1.4 molar equivalents of one or more N,N-dialkylalkanolamines in aqueous medium.

In an embodiment, the aqueous dispersion is prepared by reacting the ethylene-acrylic polymer with about 0.8 to about 1.2 molar equivalents of one or more N,N-dialkylalkanolamines in aqueous medium.

Suitable N,N-dialkylalkanolamines have formula $R_1R_2NR_3OH$ where $R_1$ and $R_2$ are straight or branched alkyl groups of one to about 4 carbon atoms and $R_3$ is straight or branched alkylene of one to about 4 carbon atoms.

In an embodiment, the N,N-dialkylalkanolamines are selected from the group consisting of N,N-dimethyl-2-(2-aminoethoxy)ethanol, N,N-diethylethanolamine, N,N-dimethylisopropanolamine, N,N-dimethylethanolamine, N,N-dibutylethanolamine and N,N-diisopropylethanolamine.

In an embodiment, the N,N-dialkylalkanol amine is N,N-dimethylethanolamine.

In an embodiment, the aqueous dispersion comprises about 5 to about 40 weight percent of one or more ethylene-acrylic acid polymers.

In an embodiment, the aqueous dispersion comprises about 10 to about 30 weight percent of one or more ethylene-acrylic acid copolymers.

In an embodiment, the aqueous dispersion comprises about 14 to about 20 weight percent of one or more ethylene-acrylic acid polymers.

In an embodiment, the ethylene-acrylic acid polymers are selected from the group consisting of ethylene-acrylic acid copolymers.

In an embodiment, this invention is a method of preparing a substrate for use in electrophotographic or digital offset printing processes comprising applying to the substrate an aqueous dispersion comprising about 5 to about 40 weight percent of one or more ethylene-acrylic acid polymers and about 0.2 to about 1.4 molar equivalents, based on acrylic acid monomer of one or more N,N-dialkylalkanolamines.

Suitable substrates include any printable substrate sheet capable of supporting the ethylene-acrylic acid resin described herein on its surface including, for example, paper, including art paper, coated paper, paper board, and the like, film, nonwoven fabric cloth, and the like.

As used herein, "film" means a substrate sheet which is made of an organic resin such as viscose, acetate, polyethylene, polypropylene, poly(vinyl chloride), polystyrene, nylon, polycarbonate, poly(ethylene terephthalate) or poly (butylene terephthalate).

"Nonwoven fabric cloth" means a substrate sheet which is made from a fiber material such as a wood cellulose, cotton, rayon, poly(ethylene terephthalate), poly(butylene terephthalate), polyacrylonitrile or polypropylene by applying a publicly known process such as a spun bond process or a paper process.

In an embodiment, the substrate is paper.

The aqueous dispersion may be applied to the substrate by any of a number of methods known in the art which result in uniform coverage of the substrate. For example, the aqueous dispersion may be applied to the substrate by immersion, by spray, by rod or roller, or using equipment such as a size press, blade coater, cast coater, rod coater, air knife coater, curtain coater, and the like.

The aqueous dispersion may be applied to the substrate alone or in combination with any number of additives used to enhance sheet properties. Such additives include starch, polyvinyl alcohol, carboxymethyl cellulose, guar, fillers and pigments such as clay and calcium carbonate, binders, dyes, optical brighteners, crosslinkers, defoamers, anti-stats, dispersants, thickeners, and the like. The additives may be applied to the substrate before, during or after application of the aqueous ethylene-acrylic acid dispersion.

In an embodiment, the additive is starch.

In an embodiment, the starch is selected from ethylated, oxidized and cationic starches. Examples of suitable ethylated, oxidized and cationic starches include, but are not limited to, ethylated corn starches, enzyme converted oxidized starches, quaternary ammonium cationic starch derivatives, primary, secondary and tertiary amine cationic starch derivatives and other cationic nitrogen substituted starch derivatives as well as cationic sulfonium and phosphonium starch derivatives.

In an embodiment, the additives are formulated with the aqueous ethylene-acrylic acid dispersion of this invention. The composition can be prepared by mixing the dispersion with starch solution or other additives when making size press formulations. Pigmented compositions containing neutralized ethylene-acrylic acid polymers can be prepared in accordance with paper coating preparation procedures.

The foregoing may be better understood by reference to the following examples, which are presented for purposes of illustration and are not intended to limit the scope of the invention.

EXAMPLE 1

Preparation of an Aqueous Ethylene-acrylic Acid Copolymer—Dimethylethanolamine Ionomer Dispersion A 300 ml Parr bomb reactor is equipped with a reactor head employing a stirring shaft that connects to a drive motor. Additionally, the reactor head is equipped with a thermocouple, a pressure gauge, a release valve, and sample ports. Two impellers are installed on the stirring shaft, one near the reaction mixture surface and the other at the end of the shaft to provide maximum agitation. Into the Parr reactor is added 20.0 g ethylene-acrylic acid copolymer (melt index 65, 15% acrylic acid monomer, available as XUS60751.18 from The Dow Chemical Company, Midland, Mich.) and a mixture of deionized water (176.57 g), dimethylethanolamine (DMEA, 4.46 g from Alfa Aesar, Ward Hill, Mass. or from Huntsman Performance Chemicals, The Woodlands, Tex., Span 60 (0.77 g), and Tween 60 (1.26) g both from Uniqema, New Castle, Del. The reactor is then bolted closed and the Parr assembly is placed into a heating mantle. The stirring speed is gradually increased to 800 rpm. The temperature of the reaction mixture is gradually increased to 120° C. and maintained between 120 and 130° C. for 3 hours. After the reaction, the reactor is cooled to ambient temperature and the product is poured into a plastic container. The off-white, slightly turbid reaction product has a pH of 10.22.

EXAMPLE 2

COMPARATIVE EXAMPLE

The neutralized ethylene-acrylic acid dispersion is prepared as described in Example1 except substituting ammonium hydroxide for dimethylethanolamine. The resulting reaction product is off-white and non-uniform and contains many flocs. It has a pH of 10.44.

EXAMPLE 3

Preparation of an Aqueous Ethylene-acrylic Acid Copolymer—Dimethylethanolamine Ionomer Dispersion The reactor is as described in Example 1. Into reactor is added 30.0 g ethylene-acrylic acid copolymer (melt index 65, 15% acrylic acid monomer, available as in Example 1) and a mixture of deionized water (163.31 g) and DMEA (6.69 g). The reactor is then bolted shut and the Parr assembly is placed into a heating mantle. The stirring speed is gradually increased to 800 rpm. The temperature of the reaction mixture is gradually increased to 120° C. and maintained between 120 and 130° C. for 3 hours. The reactor is then cooled to ambient temperature and the product is poured into a plastic container. The reaction product is off-white and slightly turbid with a pH of 10. The mean particle size of the reaction product measured using light scattering is about 23.2 nm.

EXAMPLE 4

Preparation of an Aqueous Ethylene-acrylic Acid Copolymer—Dimethylethanolamine Ionomer Dispersion The reactor is as described in Example 1. Into the reactor is added 30.0 g of ethylene-acrylic acid polymer (melt index 18, 14.8% acrylic acid monomer, available as XUS60568.05 from The Dow Chemical Company, Midland, Mich.) and a mixture of deionized water (163.31 g) and dimethylethanolamine (6.90 g). The reactor is then bolted shut and the Parr assembly is placed into a heating mantle. The stirring speed is gradually increased to 800 rpm. The temperature of the reaction mixture is gradually increased to 120° C. and maintained between 120 and 130° C. for 3 hours. The reactor is then cooled to ambient temperature and the product is poured into a plastic container. The translucent, turbid reaction product has a pH of 10. The mean particle size of the reaction product measured using light scattering is about 75.8 nm.

EXAMPLE 5

Preparation of Coating Formulations and Treatment of Base Sheet

The base paper used in this example is uncoated wood free sheet with basis weight of about 85 $g/m^2$. A #5 drawdown rod is used to apply the formulations on to the base paper with size of 8.5"×12". Then the wet sheet is dried through a drum dryer manufactured by Adirondack Machine Company, Queensbury, N.Y. Both sides of the base paper are treated to minimize paper curling and ensure print runnability. The coating pick-up is about 20 lb/ton of paper. Representative formulations are shown in Table 1.

TABLE 1

Representative Coating Formulations

| Coating Formulation No. | Dispersion[1] (Active) Parts | PG280[2] Parts | D.I. water Parts |
|---|---|---|---|
| 1 | 0 | 8 | 92 |
| 2 | 8 | 0 | 92 |
| 3 | 6.4 | 1.6 | 92 |
| 4 | 7.2 | 0.8 | 92 |

[1]Aqueous ethylene-acrylic acid dispersion prepared according to the method of Example 4.
[2]Ethylated starch manufactured and sold by Penford Products, Cedar Rapids, IA.

EXAMPLE 6

Indigo Digital Offset Print Quality Evaluation

The coated paper prepared in Example 5 is used in this example. The printer used for printing is a HP 3000 Indigo Sheet-fed press. A four-color print target is used for the printing, which includes cyan, magenta, yellow and black. A 1" Scotch Drafting Tape 230 is placed on the printed color target 15 minutes after printing and the sheet with adhered tape is sandwiched between two rubber pads. A 2-lb. roller is rolled back and forth on the pad back and the tape is peeled off at an angle of about 45-degrees. The tape-peeled area of the print target is scanned and analyzed using image analysis software. The toner adhesion is expressed as the area percent of toner coverage after peeling. The percent toner adhesion is shown in Table 2.

TABLE 2

Toner Adhesion Data for Printed Sheets

| Coating Formulation No. | Coat pick-up (lb/ton) | Black | Cyan | Magenta | Yellow |
|---|---|---|---|---|---|
| 1 | 24.8 | 71.7 | 89.5 | 72.4 | 63.5 |
| 2 | 21.7 | 100 | 98.7 | 99.7 | 100 |
| 3 | 20.0 | 100 | 99.2 | 99.7 | 99.9 |
| 4 | 22.6 | 100 | 98.5 | 100 | 100 |

The data shown in Table 2 demonstrate that almost complete toner adhesion can be obtained with any color ink using paper treated with representative formulations according to this invention.

Changes can be made in the composition, operation, and arrangement of the method of the invention described herein without departing from the concept and scope of the invention as defined in the claims.

The invention claimed is:

1. A method of preparing a paper having improved toner adhesion in electrophotographic or digital offset printing processes comprising applying to the paper an aqueous dispersion comprising one or more ethylene-acrylic acid polymers and an amount of one or more N,N-dialkylalkanolamines suitable to result in an aqueous dispersion comprising dispersed solids having a mean particle size less than about 100 nm, wherein said aqueous dispersion does not contain alkaline metal hydroxides.

2. Paper prepared according to the method of claim 1 wherein the aqueous dispersion comprises about 5 to about 40 weight percent of one or more ethylene-acrylic acid polymers.

3. Paper prepared according to the method of claim 1 wherein the aqueous dispersion comprising comprises about 0.2 to about 1.4 molar equivalents, based on acrylic acid monomer of one or more N,N-dialkylalkanolamines.

4. Paper prepared according to the method of claim 1 wherein the ethylene-acrylic acid polymer comprises about 5 to about 30 mole percent of acrylic acid monomers.

5. Paper prepared according to the method of claim 1 wherein the ethylene-acrylic acid polymer comprises about 5 to about 20 mole percent of acrylic acid monomers.

6. Paper prepared according to the method of claim 1 wherein the ethylene-acrylic acid polymer comprises about 14 to about 20 mole percent of acrylic acid monomers.

7. Paper prepared according to the method of claim 1 wherein the ethylene-acrylic acid polymer comprises about 5 to about 25 weight percent of acrylic acid monomers.

8. Paper prepared according to the method of claim 1 wherein the ethylene-acrylic acid polymer comprises about 14 to about 25 weight percent of acrylic acid monomers.

9. Paper prepared according to the method of claim 1 wherein the ethylene-acrylic acid polymers have a melt index of about 10 g/10 minutes to about 3,000 g/10 minutes.

10. Paper prepared according to the method of claim 1 wherein the ethylene-acrylic acid polymers have a melt index of about 10 g/10 minutes to about 2,500 g/10 minutes.

11. Paper prepared according to the method of claim 1 wherein the ethylene-acrylic acid polymers have a melt index of about 10 g/10 minutes to about 200 g/10 minutes.

12. Paper prepared according to the method of claim 1 wherein the N,N-dialkylalkanolamines are selected from the group consisting of N,N-dimethyl-2-(2-aminoethoxy)ethanol, N,N-diethylethanolamine, N,N-dimethylisopropanolamine, N,N-dimethylethanolamine, N,N-dibutylethanolamine and N,N-diisopropylethanolamine.

13. Paper prepared according to the method of claim 1 wherein the N,N-dialkylalkanolamine is N,N-dimethylethanolamine.

14. Paper prepared according to the method of claim 1 wherein the aqueous dispersion comprises about 0.5 to about 1.4 molar equivalents, based on acrylic acid monomer of one or more N,N-dialkylalkanolamines.

15. Paper prepared according to the method of claim 1 wherein the aqueous dispersion comprises about 0.8 to about 1.2 molar equivalents, based on acrylic acid monomer of one or more N,N-dialkylalkanolamines.

16. Paper prepared according to the method of claim 1 wherein the aqueous dispersion comprises about 10 to about 30 weight percent of one or more ethylene-acrylic acid polymers.

17. Paper prepared according to the method of claim 1 wherein the aqueous dispersion comprises about 14 to about 20 weight percent of one or more ethylene-acrylic acid polymers.

18. Paper prepared according to the method of claim 1 wherein the ethylene-acrylic acid polymers are selected from the group consisting of ethylene-acrylic acid copolymers.

19. Paper prepared according to the method of claim 18 wherein the N,N-dialkylalkanolamine is N,N-dimethylethanolamine.

20. Paper prepared according to the method of claim 1 wherein the aqueous dispersion further comprises one or more additives selected from the group consisting of starch, polyvinyl alcohol, carboxymethyl cellulose, guar, pigments, binders, dyes, optical brighteners, crosslinkers, defoamers, anti-stats, dispersants and thickeners.

21. Parer prepared according to the method of claim 20 wherein the additive is starch.

22. Paper for use in electrophotographic or digital offset printing printing processes prepared according to the method of claim 1.

* * * * *